(12) United States Patent
Sartor et al.

(10) Patent No.: US 11,659,223 B2
(45) Date of Patent: *May 23, 2023

(54) SYSTEM, DEVICE AND METHOD FOR DISPLAYING DISPLAY-DEPENDENT MEDIA FILES

(71) Applicant: SONY CORPORATION, Tokyo (JP)

(72) Inventors: Piergiorgio Sartor, Fellbach (DE); Klaus Zimmermann, Neckartenzlingen (DE)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/215,947

(22) Filed: Mar. 29, 2021

(65) Prior Publication Data

US 2021/0219007 A1 Jul. 15, 2021

Related U.S. Application Data

(63) Continuation of application No. 14/588,601, filed on Jan. 2, 2015, now Pat. No. 10,965,974.

(30) Foreign Application Priority Data

Mar. 17, 2014 (EP) .................................. 14160199

(51) Int. Cl.
*H04N 21/2662* (2011.01)
*H04N 21/2343* (2011.01)
(Continued)

(52) U.S. Cl.
CPC ..... *H04N 21/2662* (2013.01); *H04N 21/2343* (2013.01); *H04N 21/25825* (2013.01); *H04N 21/6582* (2013.01)

(58) Field of Classification Search
CPC ......... H04N 21/2343; H04N 21/25825; H04N 21/2662; H04N 21/6582
See application file for complete search history.

(56) References Cited

U.S. PATENT DOCUMENTS 8,385,971 B2    2/2013  Rhoads et al.
2005/0128192 A1  6/2005  Heintzman et al.
(Continued)

FOREIGN PATENT DOCUMENTS

CN    1717674 A     1/2006
CN    103220577 A   7/2013
(Continued)

OTHER PUBLICATIONS

Chinese Office Action dated Aug. 29, 2019, issued in corresponding Chinese Application No. 201510036550.3.
(Continued)

*Primary Examiner* — Ming Wu
(74) *Attorney, Agent, or Firm* — Xsensus LLP

(57) ABSTRACT

It is disclosed a system comprising a display characteristics evaluation unit configured to evaluate display characteristics of a display of an electronic device, a media access unit configured to receive a source media file from a media storage, and a display-dependent processing unit configured to perform, based on the display characteristics, a display-dependent processing of the source media file to obtain a display-dependent media file.

20 Claims, 9 Drawing Sheets

(51) Int. Cl.
*H04N 21/258* (2011.01)
*H04N 21/658* (2011.01)

(56) References Cited

U.S. PATENT DOCUMENTS

| | | |
|---|---|---|
| 2005/0210338 A1 | 9/2005 | Young |
| 2006/0087585 A1 | 4/2006 | Seo et al. |
| 2007/0053293 A1 | 3/2007 | McDonald et al. |
| 2008/0165115 A1 | 7/2008 | Herz et al. |
| 2009/0091578 A1* | 4/2009 | Carnahan ........... H04N 21/4622 345/522 |
| 2011/0145062 A1* | 6/2011 | Yankovich ......... G06Q 30/0275 705/14.51 |
| 2012/0016663 A1* | 1/2012 | Gillam .................... G06F 16/33 704/9 |
| 2012/0154382 A1* | 6/2012 | Ikeda ................... H04N 13/128 345/419 |
| 2012/0212575 A1 | 8/2012 | Chen et al. |
| 2012/0249736 A1 | 10/2012 | Barrett et al. |
| 2013/0093774 A1 | 4/2013 | Sridhar |
| 2013/0120342 A1 | 5/2013 | Wang et al. |
| 2013/0185353 A1 | 7/2013 | Rondao Alface et al. |
| 2014/0024341 A1 | 1/2014 | Johan |
| 2014/0055497 A1 | 2/2014 | Sohn |

FOREIGN PATENT DOCUMENTS

| | | |
|---|---|---|
| CN | 103379363 A | 10/2013 |
| CN | 103561279 A | 2/2014 |
| WO | 2011/143916 A1 | 11/2011 |

OTHER PUBLICATIONS

Chinese Office Action and Search Report dated Sep. 7, 2018 in Chinese Application No. 201510036550.3.
"Cleveland Community College Helps Build Careers—With Samsung Cloud Displays", Case Study Education, 2012, 2 pgs.
"Del Valle Schools Expand Student Computing—With Samsung Cloud Displays", Case Study Education, 2012, 2 pgs.
Wei Cai, et al., "Next Generation Mobile Cloud Gaming", IEEE Seventh International Symposium on Service-Oriented System Engineering, 2013, 10 pgs.
Dither Wikipedia, Jan. 20, 2014.

* cited by examiner

SYSTEM, DEVICE AND METHOD FOR DISPLAYING DISPLAY-DEPENDENT MEDIA FILES

This is a continuation of U.S. application Ser. No. 14/588,601 filed Jan. 2, 2015, which claims priority to European Patent Application 14160199.7 filed on Mar. 17, 2014 the entire contents of each of which are incorporated herein by reference.

TECHNICAL FIELD

The present disclosure generally pertains to systems, devices, and methods for providing and/or viewing display-dependent media files.

TECHNICAL BACKGROUND

Modern display technology is heavily depending on digital processing. From basic stream decoding, to advanced frame rate conversion, a lot of computation is required in order to fit and match characteristics of display devices.

A lot of content to be displayed is available on network based services, for example on "cloud" services. The content could for example be third party content (movies, advertisements) or user generated content (cloud storage).

When watching this content on a client device, all the processing required by the display is typically done in the client device itself. Each device has to run all the respective algorithms by itself. This needs computing power and uses battery power. Further, a cloud platform may provide its service to a large number of client devices and all client devices have to run the computations in the same way separately and independently.

In the light of this it is desirable to find better ways of doing the processing required by a display device.

SUMMARY

According to a first aspect it is disclosed a system comprising a display characteristics evaluation unit configured to evaluate display characteristics of a display of an electronic device, a media access unit configured to receive a source media file from a media storage, and a display-dependent processing unit configured to perform, based on the display characteristics, a display-dependent processing of the source media file to obtain a display-dependent media file.

According to a further aspect it is disclosed an electronic device comprising a display having display characteristics, a transmission unit configured to transmit the display characteristics to a media server, and a reception unit configured to receive, from the media server, a display-dependent media file, the display dependent media file having been processed based on the display characteristics.

According to a still further aspect it is disclosed a method comprising evaluating display characteristics of a display of an electronic device, receiving a source media file from a media storage, and processing, based on the display characteristics, the source media file to obtain a display-dependent media file.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
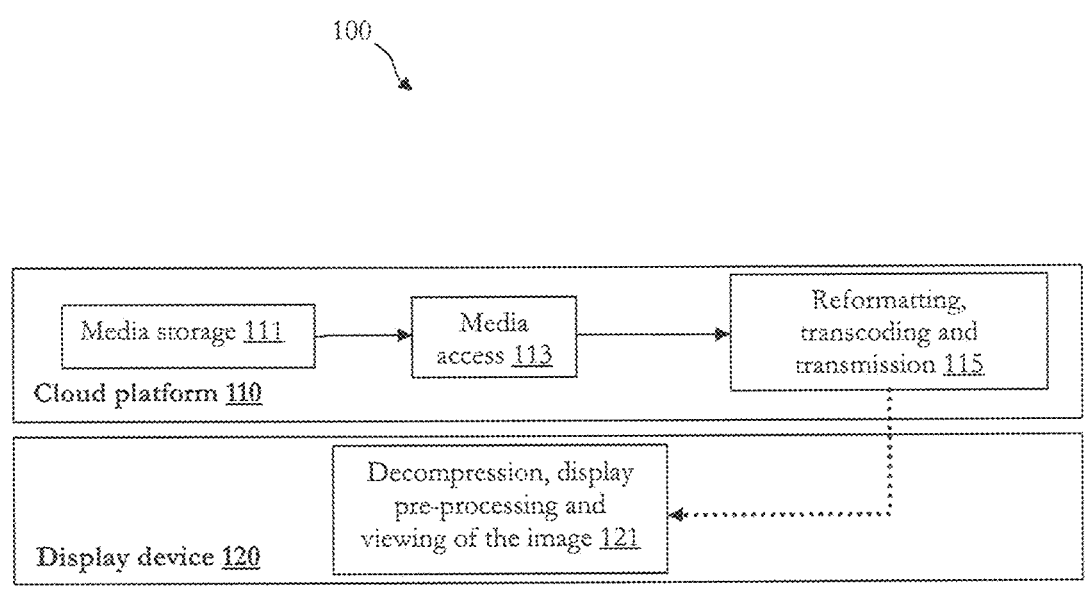
FIG. 1 schematically shows a conventional system comprising a cloud platform which provides, as a cloud service, media files to a display device.

Before a detailed description of the embodiments will be given under reference of FIG. 1 some general explanations are made.

A system for providing display-dependent media files may comprise a display characteristics evaluation unit configured to evaluate display characteristics of a display of an electronic device, a media access unit configured to receive a source media file from a media storage, and a display-dependent processing unit configured to perform, based on the display characteristics, a display-dependent processing of the source media file to obtain a display-dependent media file.

The electronic device may for example be a mobile client display device such as a mobile phone, a digital camera, a personal viewer, a laptop, a tablet PC or the like. Alternatively, the electronic device may also be a stationary device such as, for example, a television set, a (home) theatre projector, a desktop PC or the like.

The media storage may store one or more source media files. The media storage may for example store one or more personal media files which are attributed to a particular user of a cloud service. The media storage may also store a large number of media files which are provided for public viewing. A source media file may comprise recorded video and/or audio content. Alternatively, the media storage may also be a temporary storage and the source media files may represent live media content which is arranged for live streaming to one or more streaming clients. The media storage may store full audio and video content or only parts of audio and video content. The source media file may represent full media content such as movies, advertisements or the like. Alternatively, the source media file may comprise only parts of media contents such as movies, advertisements or the like.

According to the disclosed system part or all of the processing required by the electronic device for displaying a source media file may be performed external to the electronic device, e.g. in the cloud. A cloud platform, for example, may have the computational power to do the processing at very high quality. Performing part or all of the processing external to the electronic device may further avoid the duplication of functionality in multiple electronic devices which act as display clients of, for example, a cloud service.

In some of the embodiments almost all the hardware for the processing of the displayed images is removed from the electronic device. It may thus become more cost efficient to produce the electronic device. Furthermore, the removal of the hardware may result in more freedom in the industrial design to allow smaller electronic devices. In addition the removal of the processing hardware may extend the battery life time of electronic devices and reduce the power consumption of stationary display devices.

In some of the embodiments the electronic device may be considered as a "cloud display" with scalable image quality. Hardware complexity may be reduced and the electronic device may be implemented as a rendering device only.

In some embodiments the processes of image formation and post-processing are completely transferred and managed external to the electronic device, for example in the cloud.

The display-dependent processing may for example comprise transcoding of the media source file. Transcoding relates to converting data from an original coding to a target coding. Such transcoding may for example be realized as a two-step process in which a source media file is decoded from an original coding such as H.264 to an intermediate format, which is then encoded into a target format. The intermediate format may be an uncompressed format such as PCM for audio or YUV for video. The target coding may be a coding which is optimized for display on the electronic device.

The display characteristics evaluation unit may be configured to receive display characteristics of the display of the electronic device. The receiving of the display characteristics may happen in explicit or implicit form. Receiving display characteristics in explicit form may comprise receiving a frame rate or a screen resolution of a display. Receiving display characteristics in implicit form may comprise receiving a display model identification. The system may then request display parameters associated with this display model identification from a database which attributes display parameters to a display model identification. The system may then use these display parameters as the display characteristics.

The system for providing display-dependent media files may further comprise a transmission unit configured to transmit the display-dependent media file to the electronic device. The transmission unit may for example be a streaming media server.

The system for providing display-dependent media files may further comprise a media storage configured to store media files. The media storage may be a storage device such as a hard disk, or cloud storage platform.

The system for providing display-dependent media files may further comprise a pre-visualization processing unit configured to perform a minimal processing of the source media file to obtain a pre-visualization media file, and a pre-visualization transmission unit configured to transmit the pre-visualization media file to an electronic device.

The display characteristics evaluation unit, the media access unit, and the display-dependent processing unit may be part of a media server. This media server may be configured as a cloud service or may be part of a cloud service.

An electronic device for presenting display-dependent media files may comprise a display having display characteristics, a transmission unit configured to transmit the display characteristics to a media server, and a reception unit configured to receive, from the media server, a display-dependent media file, the display dependent media file having been processed based on the display characteristics. The display may be any kind of display such as an LCD display, plasma display or AMOLED display.

The electronic device for presenting display-dependent media files may further comprise a decoding unit configured to decode the display-dependent media file.

The display may be configured to display the display-dependent media file on the display. This displaying may for example involve a display driver.

A method for providing display-dependent media files may comprise evaluating display characteristics of a display of an electronic device, receiving a source media file from a media storage, and processing, based on the display characteristics, the source media file to obtain a display-dependent media file.

The method for providing display-dependent media files may further comprise receiving the display characteristics from the electronic device.

The method for providing display-dependent media files may further comprise transmitting the display-dependent media file to the electronic device.

The method for providing display-dependent media files may further comprise performing a minimal processing of the source media file to obtain a pre-visualization media file, and transmitting the pre-visualization media file to the electronic device.

The processing the source media file to obtain a display-dependent media file may comprise at least one of converting the frame rate of the source media file, adapting the source media file to a display technique, adapting the color dynamic range of the source media file, applying temporal and/or spatial dithering, adapting the display resolution, adapting the sub-pixel pattern of the source media file, modifying the 3D stereo content of the source media file, removing temporal artifacts in the source media file, transforming an interlaced source media file to a non-interlaced source media file, modifying the aspect ratio of the source media file, and changing contrast characteristics depending on ambient light conditions.

According to an example a display may support 100/120 Hz refresh rate, but the content of a source media file may be coded at 25/30 Hz. In this case, instead of transmitting 25/30 Hz and performing the up-conversion in the display, the source media file may be directly up-converted in a server of a cloud platform. The server of a cloud platform may have more computational power so that it can perform the up-conversion with higher quality algorithms. The client electronic device may thus enjoy better quality, with lower computational power.

According to a further example the display of an electronic device is of the LCD-type with RGB pixels striped, or it might be AMOLED with pen-tile arrangement, or else. The content of a source media file may be processed in order to properly fit the display pixel pattern of the display type. This can be done in the server, before sending the data to the client electronic device.

According to a yet further example the display may support effectively 6 bits per color dynamic range. In the case of a source media file with 8 bits per color dynamic range temporal and/or spatial dithering may be required. This temporal and/or spatial dithering may be done external to the electronic device, e.g. directly in a server, again with better algorithms, thus increasing quality and reducing computational cost for the client electronic device.

According to a still further example the display resolution of the electronic device might be completely different than the pixel resolution with which the source media file was coded. Also in this case a server can fit the resolution properly. Once again, better quality can be expected.

According to a still further example a sub-pixel pattern could be RGBY (where RGB is Red, Green and Blue, and Y is yellow) or RGBW (where W is white). Creating the new color component, especially yellow, might be a computational expensive task. A server might do this with better quality results.

According to a still further example some 3D displays require special processing in order to modify the 3D stereo content before using it. Similarly to the frame rate conversion, this operation could be performed at server level. Again, quality up a processing down for the client.

According to a still further example some displays, like plasma ones, can suffer from temporal artifacts (when video with motion is shown), thus requiring specific temporal processing of the content before using it. Also this can be done in the server in advance.

Another example relates to the fact that modern displays are almost always of the progressive type. However, the content of a source media file might be interlaced. Usually the conversion (I2P, interlace to progressive) takes place in the display itself. According to an embodiment, this conversion is done external to the electronic device. For example, a server may have better processing power so that it can do a better job, in terms of quality, than the client electronic device.

Yet another example relates to the fact that a display can have an aspect ratio which is different than the aspect ratio of the source media file. Linear scaling can be applied or a content adaptive recoding (retargeting) may be done external to the electronic device. In particular the second case may require a lot of computational power, and might be difficult to implement in a thin client.

A still further example relates to the fact that some displays can change (contrast) characteristics depending on ambient light conditions. This information can be sent to a server, which can change the content appropriately, before sending it to the client electronic device, thus avoiding the operation in the display itself. This might be especially interesting in the case of mobile devices that are subject to completely different ambient conditions (sunlight, dark, etc.).

Other cases of specific or non-specific processing which is performed for display a media file on a display may be performed external to the electronic device which contains the display.

The display-dependent processing may also consider parameters of the communication link, such a transmission bandwidth. The display-dependent processing may thus also comprise a bandwidth dependent processing. For example, the frame rate and/or the resolution may be reduced when the bandwidth of the communication link gets worse, and the frame rate and/or the resolution may be increased when the bandwidth of the communication link gets better.

The source media files as described above may be provided for streaming to an electronic device. Display-dependent processing of a source media file may for example comprise converting a H.264 coded media file or media stream into multiple lower resolution/data rate streams. For example, a transcoder might convert a 720p stream into a stream configured at 848×480@1000, 640×360@700, 480×270@500 or 320×180@200 Kbps, depending on the display characteristics of the electronic device.

Further, the display characteristics may comprise settings which are provided by a user of the electronic device. For example a user of the electronic device might provide settings for display parameters such as sharpness, brightness, contrast, grain, white-balance, etc. Such display parameters can be transmitted to a media server as part of display characteristics. A display-dependent processing unit of a media server may then use these display parameters to adjust a source media file in accordance with the display parameters set by the user. For example, a sharpness filter might be applied to the source media file in accordance with the sharpness settings provided by the user, a source media file might be optimized for displaying at high brightness, the white-balance of a source media file might be changed based on the user settings, etc.

The processes described above may be configured in such a way that they are optimally adapted to the available bandwidth and the display used in an electronic device.

The processes may be future-prove since, for example, their underlying algorithms can be upgraded easily in the cloud so that the customers apply advancements in the image processing development to images stored in the cloud so that they can always be visualized on the display with optimal quality.

FIG. 1 schematically shows a conventional system 100 comprising a cloud platform 110 which provides, as a cloud service, media files to a display device 120. The cloud platform 110 comprises a media storage 111 in which media files are stored. A media access unit 113 is configured to receive at least one media file from the media storage 111. A reformatting, transcoding and transmission unit 115 is configured to receive the media file from the media access unit 113, to reformat the media file, to transcode the media file and to transmit the reformatted and transcoded media file to display device 120. The media file transmitted from the cloud platform 110 to display device 120 does not take into account display characteristics of display device 120. Therefore a decompression, display pre-processing and viewing unit of the image 121 in display device 120 has to perform pre-processing. This pre-processing may be complex and may need sophisticated computing power.

Embodiments of a system for providing display-dependent media files are now described in more detail.

Figure 2A:
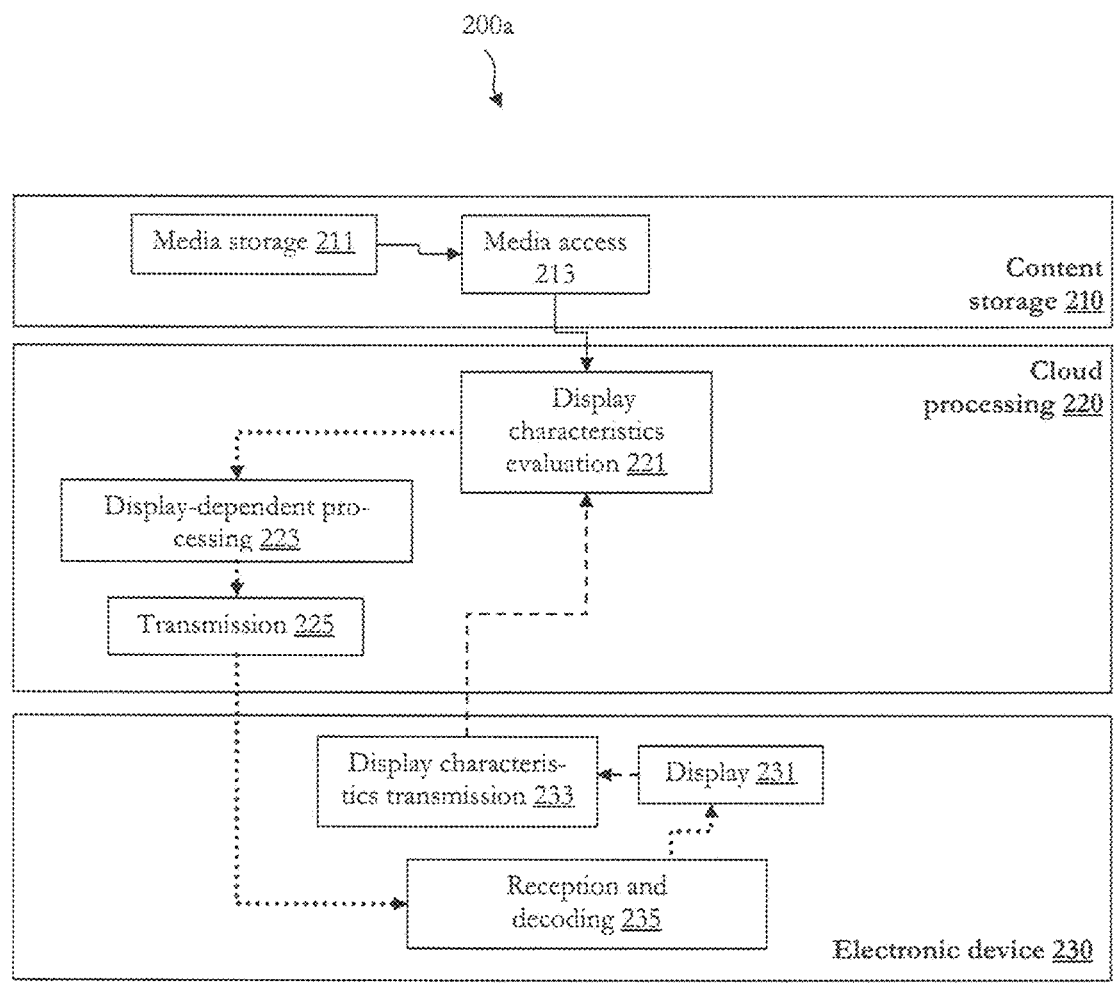
FIG. 2a schematically shows an embodiment of a system comprising a cloud platform with a content storage section and a cloud processing section, and an electronic device which is client of the cloud platform.

FIG. 2a schematically shows a system 200a comprising a content storage section 210 and a cloud processing section 220. The content storage section 210 and the cloud processing section 220 are part of a cloud platform. An electronic device 230 acts as client of the cloud platform.

The content storage section 210 comprises a media storage 211 and a media access unit 213.

The media storage 211 may be a cloud storage which comprises one or more storage servers. The media storage 211 may be located at the central office of the provider of the cloud platform. The media storage 211 may also be distributed over multiple distinct locations in order to provide a cloud service to a large number of client devices.

The media access unit 213 is configured to acquire one or more source media files from media storage 211 and to pass such source media files to the cloud processing section 220. The media access unit 213 may for example be a disk operating system, a common Internet file system (CIFS), an FTP server software, a streaming server software, or the like, located on a storage server or on a gateway server. The media access unit 213 may be a single server product or a software which is distributed over multiple distinct locations.

The cloud processing section 220 comprises a display characteristics evaluation unit 221, a display-dependent processing unit 223 and a transmission unit 225.

The display characteristics evaluation unit 221 is configured to receive display characteristics from electronic device 230 which acts as client of the cloud platform.

The display characteristics evaluation unit 221 is further configured to receive a source media file from media storage 211 by means of media access unit 213.

The display characteristics evaluation unit 221 is further configured to evaluate the display characteristics received from the electronic device 230 to produce one or more display characteristics evaluation parameters.

The display-dependent processing unit 223 receives the source media file and one or more display characteristics evaluation parameters from the display characteristics evaluation unit 221. The display-dependent processing unit 223 then performs a processing of the source media file based on the display characteristics evaluation parameters to generate a display-dependent media file. The display-dependent processing unit 223 then passes the display-dependent media file to transmission unit 225.

Transmission unit 225 is configured to transmit the display-dependent media file to the electronic device 230.

The electronic device comprises a display 231, a display characteristics transmission unit 233, and a reception and decoding unit 235. The display characteristics transmission unit 233 is configured to transmit display characteristics of display 231 to the cloud processing section 220. The reception and decoding unit 235 is configured to receive a display-dependent media file from the cloud processing section 220, to decode the content of the display-dependent media file, and to display the content of the display-dependent media file on display 231.

Although in the schematic drawing of FIG. 2a only one electronic device 230 is shown, the cloud platform may provide its service to more electronic devices or even a very large number of electronic devices.

Figure 2B:
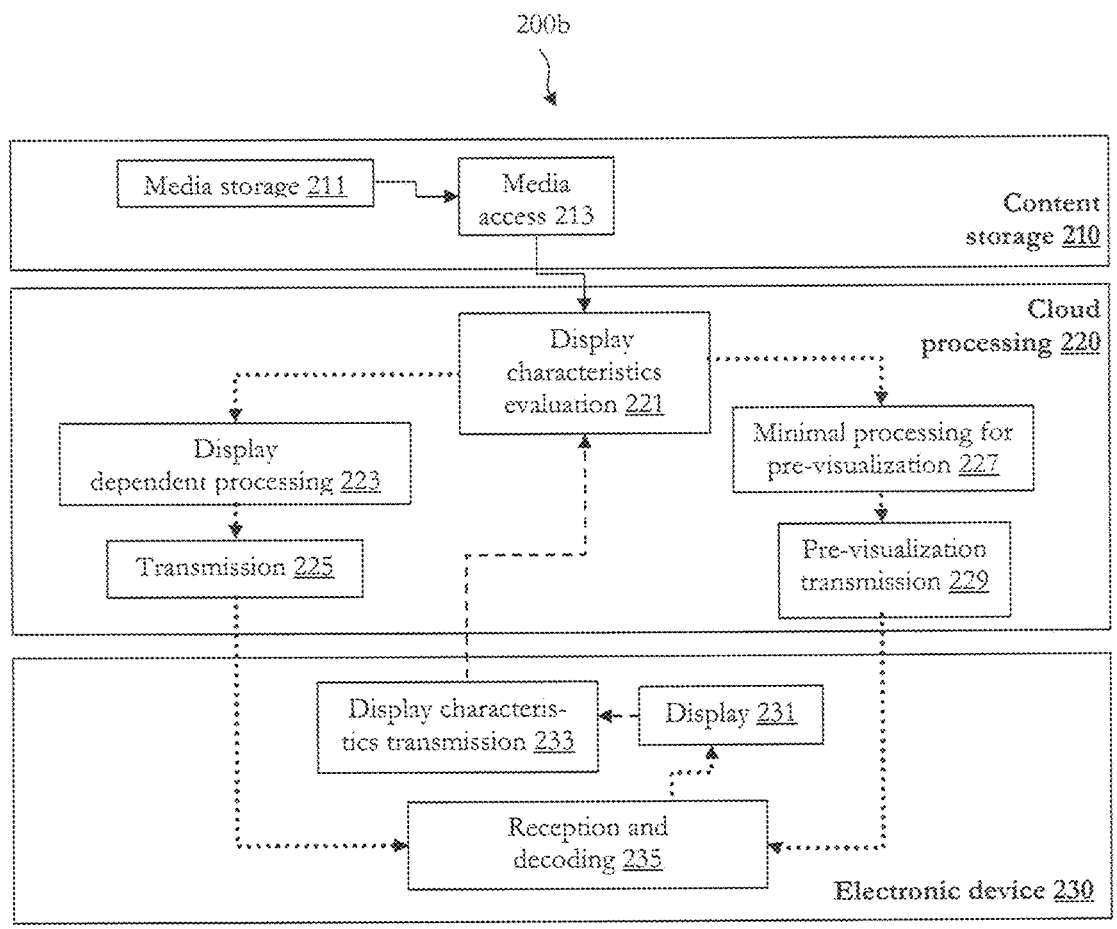
FIG. 2b schematically shows a further embodiment of a system comprising a cloud platform with a content storage section and a cloud processing section, and an electronic device which is client of the cloud platform.

FIG. 2b schematically shows a further embodiment of a system 200b comprising a cloud platform with a content storage section 210 and a cloud processing section 220, and an electronic device 230 which acts as client of the cloud platform. The content storage section 210, the cloud processing section 220, and the electronic device 230 comprise the same elements as in the embodiment of FIG. 2a. Concerning these elements which are the same as in FIG. 2a it is referred to the respective explanations above. In addition, the cloud processing section 220 of system 200b comprises a minimal processing for pre-visualization unit 227 and a pre-visualization transmission unit 229. The processing for pre-visualization unit 227 is configured to receive the source media file and one or more display characteristics evaluation parameters from the display characteristics evaluation unit 221 and to perform, based on the display characteristics evaluation parameters, pre-visualization processing to generate pre-visualization information. The pre-visualization transmission unit 229 is configured to transmit the pre-visualization information to electronic device 230. The reception and decoding unit 235 of electronic device 230 is configured to receive the pre-visualization information from the cloud processing section 220 and to display the pre-visualization information on display 231 of electronic device 230.

In the embodiment of FIG. 2b the transmission unit 225 and the pre-visualization transmission unit 229 are shown as two separate units. In alternative embodiments, the functionality of these two units may as well be performed by a single transmission unit.

Likewise, despite that in the embodiments of FIGS. 2a and 2b functionality is shown as being located in specific units. Such functionality might be relocated. For example, functionality which is described in FIGS. 2a and 2b with reference to separate units might be performed by a single physical entity such as a server computer of a cloud platform or a processor within the electronic device 230. The functionality might even be distributed over several physical entities which are located on different locations, as it is typical for cloud platforms.

Figure 3A:
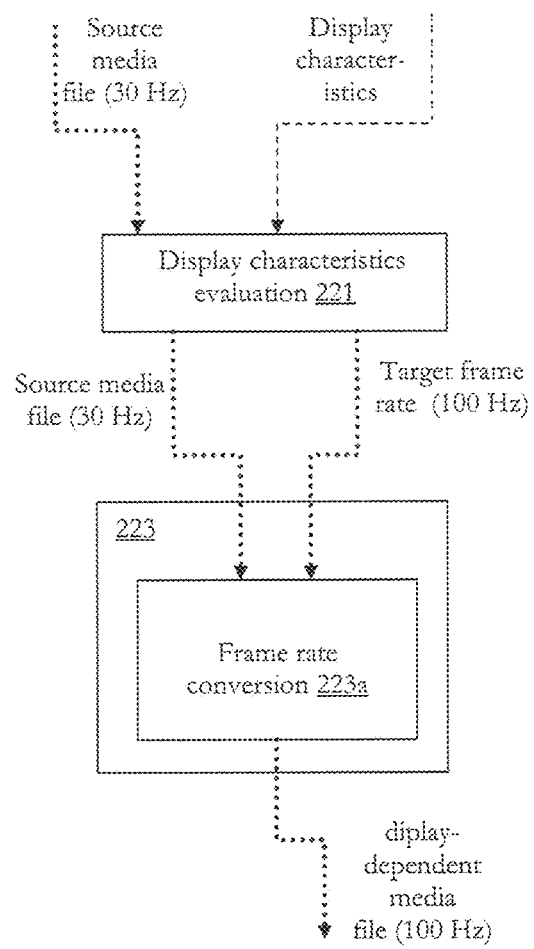
FIG. 3a schematically shows an embodiment in which the display-dependent processing unit comprises a frame rate conversion unit.
Figure 3B:
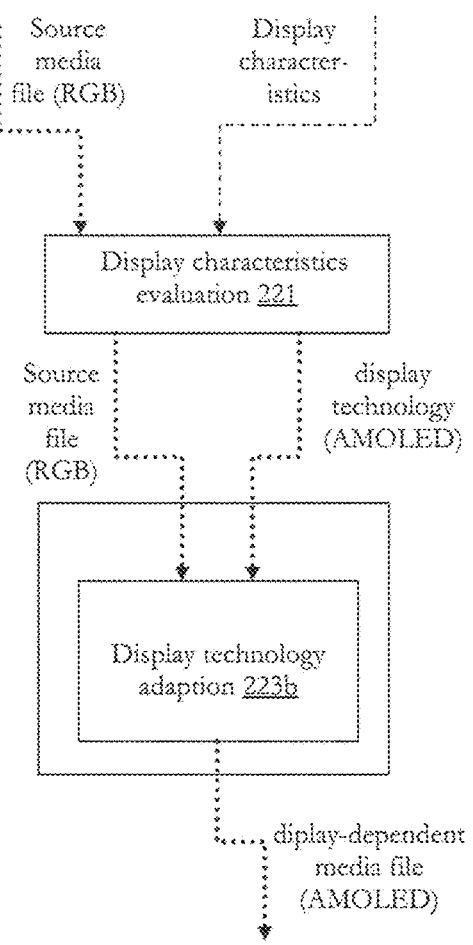
FIG. 3b schematically shows a further embodiment in which the display-dependent processing unit comprises a display technology adaption unit.
Figure 3C:
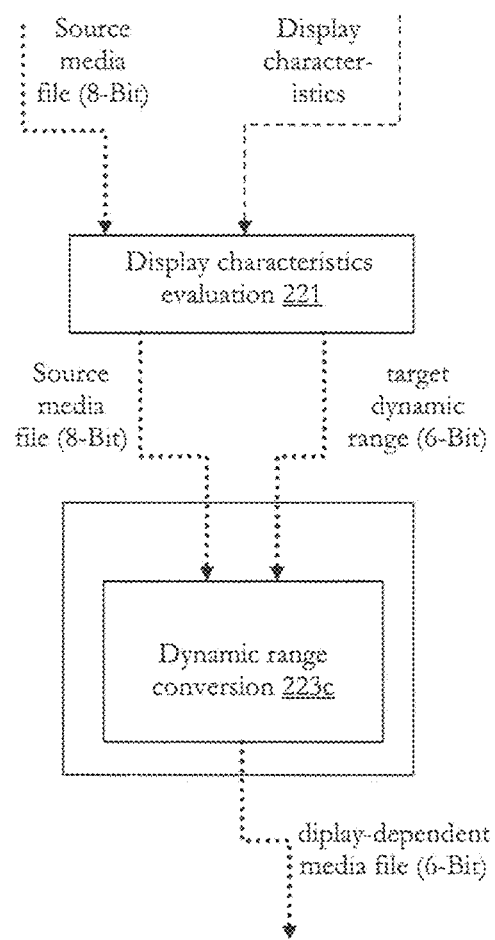
FIG. 3c schematically shows a still further embodiment in which the display-dependent processing unit comprises a dynamic range conversion unit.

FIGS. 3a, 3b, and 3c describe in more detail embodiments of display characteristics evaluation unit 221 and display-dependent processing unit 223.

In FIG. 3a it is described an embodiment in which the display-dependent processing unit 223 comprises a frame rate conversion unit 223a. The display characteristics evaluation unit 221 receives a source media file which is encoded with a frame rate of 30 Hz. The display characteristics evaluation unit 221 evaluates received display characteristics to determine that the display of the electronic device is capable of displaying media content at a frame rate of 100 Hz. The display characteristics evaluation unit 221 thus determines a target frame rate of 100 Hz as a display characteristics evaluation parameter and transmits this display characteristics evaluation parameter to display-dependent processing unit 223. The display-dependent processing unit 223 receives the source media file which is encoded at 30 Hz and the target frame rate of 100 Hz. Frame rate conversion unit 223a of display-dependent processing unit 223 up-converts the source media file to the target frame rate 100 Hz to thus produce a display-dependent media file which is coded at 100 Hz.

In FIG. 3b it is described a further embodiment. In this embodiment the display-dependent processing unit 223 comprises a display technology adaption unit 223b. The display characteristics evaluation unit 221 receives a source media file which is encoded as RGB data. The display characteristics evaluation unit 221 evaluates received display characteristics to determine that the display of the electronic device is of the AMOLED type. The display characteristics evaluation unit 221 thus determines the display type information AMOLED as a display characteristics evaluation parameter and transmits this display characteristics evaluation parameter to display-dependent processing unit 223. The display-dependent processing unit 223 receives the source media file which is encoded as RGB and the display type information AMOLED. Display technology adaption unit 223b of display-dependent processing unit 223 adapts the source media file so that it is optimized for an AMOLED-type display to thus produce a display-dependent media file which is optimized for AMOLED.

In FIG. 3c it is described a still further embodiment. In this embodiment the display-dependent processing unit 223 comprises a dynamic range conversion unit 223c. The display characteristics evaluation unit 221 receives a source media file which is encoded with a dynamic range of 8 bit per color. The display characteristics evaluation unit 221 evaluates received display characteristics to determine that the display of the electronic device is capable of displaying media content only with a dynamic range of 6 bit per color. The display characteristics evaluation unit 221 thus determines a target dynamic range of 6 bit as a display characteristics evaluation parameter and transmits this display characteristics evaluation parameter to display-dependent processing unit 223. The display-dependent processing unit 223 receives the source media file which is encoded with a dynamic range of 8 bit and the target dynamic range of 6 bit. Dynamic range conversion unit 223a of display-dependent processing unit 223 converts the source media file to the target dynamic range 6 bit to thus produce a display-dependent media file which is coded with a dynamic range of 6 bit.

Figure 4:
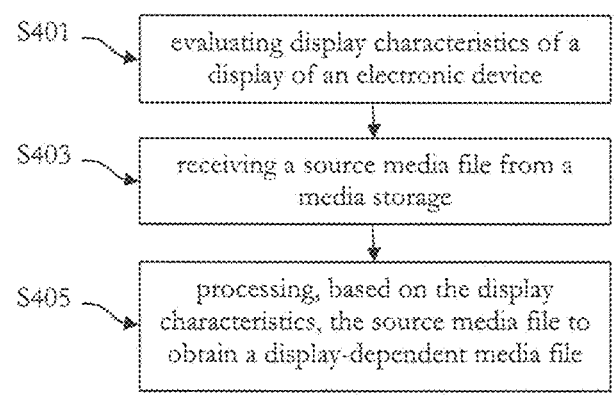
FIG. 4 schematically shows an embodiment of a method for providing display-dependent media files.

FIG. 4 schematically shows an embodiment of a method for providing display-dependent media files. At S401, display characteristics of a display of an electronic device are evaluated. At S403, a source media file is received from a media storage. At S405, the source media file is processed, based on the display characteristics, to obtain a display-dependent media file. Although in the embodiment of FIG. 5 S501-S509 are performed in a specific order, this order can be changed. For example, the order can be changed so that S403 is performed before S401.

Figure 5:
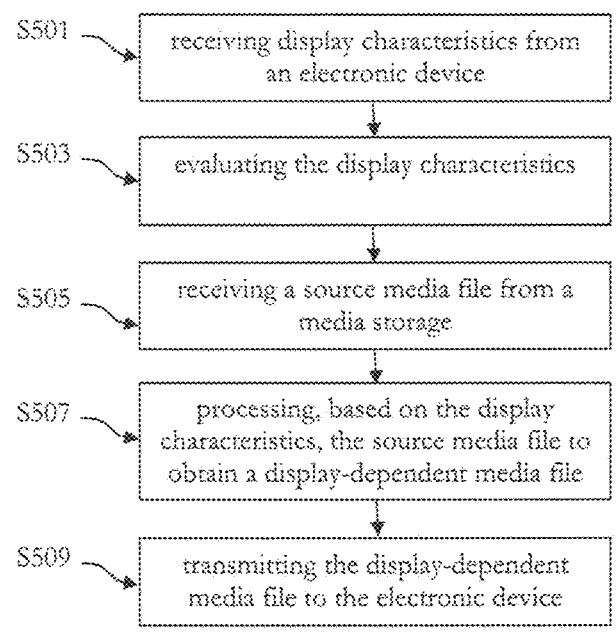
FIG. 5 schematically shows a further embodiment of a method for providing display-dependent media files.

FIG. 5 schematically shows a further embodiment of a method for providing display-dependent media files. At S501, display characteristics are received from an electronic device. At S503, the display characteristics are evaluated. At S505, a source media file is received from a media storage. At S507, the source media file is processed, based on the display characteristics, to obtain a display-dependent media file. At S509, the display-dependent media file is transmitted to the electronic device file. Although in the embodiment of FIG. 5 S501-S509 are performed in a specific order, this order can be changed. For example, the order can be changed so that S505 is performed before S503.

Figure 6:
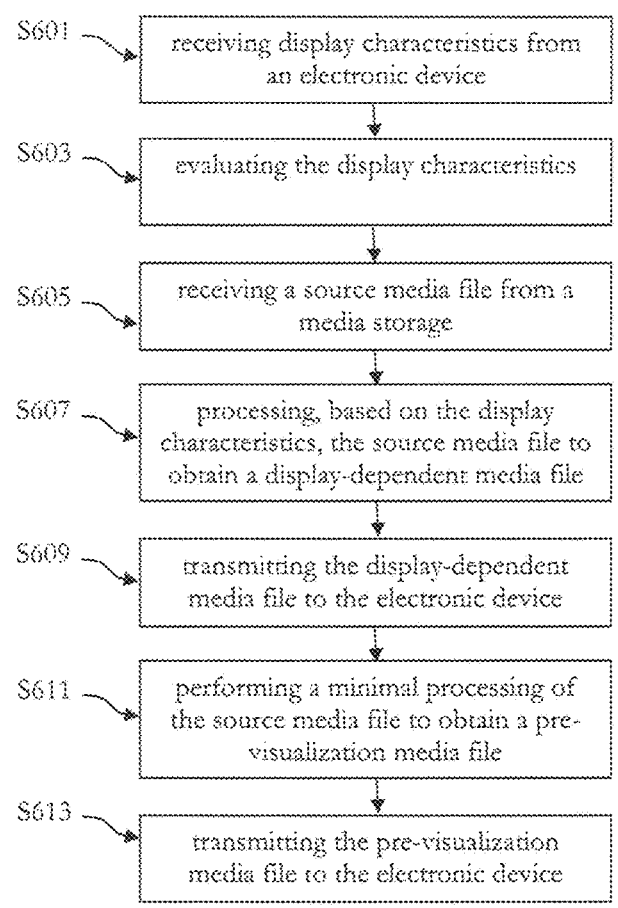
FIG. 6 schematically shows a still further embodiment of a method for providing display-dependent media files.

FIG. 6 schematically shows a further embodiment of a method for providing display-dependent media files. At S601, display characteristics are received from an electronic device. At S603, the display characteristics are evaluated. At S605, receiving a source media file from a media storage. At S607, the source media file is processed, based on the display characteristics, to obtain a display-dependent media file. At S609, the display-dependent media file is transmitted to the electronic device. At S611, a minimal processing of the source media file is performed to obtain a pre-visualization media file. At S613, the pre-visualization media file is transmitted to the electronic device. Although in the embodiment of FIG. 6 S601-S611 are performed in a specific order, this order can be changed. For example, the order can be changed so that S605 is performed before S603. Also, S609 might be performed after S613 and/or S611.

All devices and entities described in this specification and claimed in the appended claims can, if not stated otherwise, be implemented as integrated circuit logic, for example on a chip, and functionality provided by such devices and entities can, if not stated otherwise, be implemented by software.

It is disclosed here:

(1) A system comprising
  a display characteristics evaluation unit configured to evaluate display characteristics of a display of an electronic device,
  a media access unit configured to receive a source media file from a media storage, and
  a display-dependent processing unit configured to perform, based on the display characteristics, a display-dependent processing of the source media file to obtain a display-dependent media file.

(2) The system of (1), wherein the display characteristics evaluation unit is configured to receive the display characteristics of the display of the electronic device.

(3) The system of anyone of (1) or (2), further comprising a transmission unit configured to transmit the display-dependent media file to the electronic device.

(4) The system of anyone of (1) to (3), further comprising a media storage configured to store media files.

(5) The system of anyone of (1) to (4), further comprising
  a pre-visualization processing unit configured to perform a minimal processing of the source media file to obtain a pre-visualization media file, and
  a pre-visualization transmission unit configured to transmit the pre-visualization media file to an electronic device.

(6) A media server, comprising
  a display characteristics evaluation unit configured to evaluate display characteristics of a display of an electronic device,
  a media access unit configured to receive a source media file from a media storage, and
  a display-dependent processing unit configured to perform, based on the display characteristics, a display-dependent processing of the source media file to obtain a display-dependent media file.

(7) The media server of (6), wherein the media server is configured as a cloud service.

(8) An electronic device comprising
  a display having display characteristics,
  a transmission unit configured to transmit the display characteristics to a media server, and
  a reception unit configured to receive, from the media server, a display-dependent media file, the display dependent media file having been processed based on the display characteristics.

(9) The electronic device of (8), further comprises a decoding unit configured to decode the display-dependent media file.

(10) The electronic device of anyone of (8) or (9), wherein the display is further configured to display the display-dependent media file.

(11) A method comprising
  evaluating display characteristics of a display of an electronic device,
  receiving a source media file from a media storage, and
  processing, based on the display characteristics, the source media file to obtain a display-dependent media file.

(12) The method of (11), further comprising receiving the display characteristics from the electronic device.

(13) The method of anyone of (11) or (12), further comprising transmitting the display-dependent media file to the electronic device.

(14) The method of anyone of (11) to (13), further comprising
  performing a minimal processing of the source media file to obtain a pre-visualization media file, and
  transmitting the pre-visualization media file to the electronic device.

(15) The method of anyone of (11) to (14), in which the processing the source media file to obtain a display-dependent media file comprises at least one of
  converting the frame rate of the source media file,
  adapting the source media file to a display technique,
  adapting the color dynamic range of the source media file,
  applying temporal and/or spatial dithering,
  adapting the display resolution, adapting the sub-pixel pattern of the source media file,
modifying the 3D stereo content of the source media file,
removing temporal artifacts in the source media file,
transforming an interlaced source media file to a non-interlaced source media file,
modifying the aspect ratio of the source media file, and
changing contrast characteristics depending on ambient light conditions.

The invention claimed is:

1. A system, comprising:
processing circuitry configured to
evaluate display characteristics of a display of an electronic device and generate an evaluation result, the evaluation result indicating whether the display is capable of displaying media content with a dynamic range of a particular number of bits per color;
receive a source media file from a media storage; and
process the source media file, by converting the source media file according to the evaluation result, to obtain a display-dependent media file.

2. The system of claim 1, wherein the processing circuitry is configured to receive the display characteristics from the electronic device.

3. The system of claim 1, further comprising a transmitter to transmit the display-dependent media file to the electronic device.

4. The system of claim 3, wherein
the processing circuitry is further configured to perform the source media file to obtain a pre-visualization media file, and
the transmitter transmits the pre-visualization media file to an electronic device.

5. The system of claim 1, further comprising media storage configured to store media files.

6. The system of claim 1, wherein the processing circuitry generates the display-dependent media file by converting the source media file according to the evaluation result.

7. The system of claim 1, wherein the display-dependent media the has properties consistent with the display characteristics and that is optimized for display by the display of the electronic device.

8. The system of claim 1, wherein the media storage stores the source media file in association with a user of the electronic device.

9. The system of claim 1, wherein the display characteristics further indicate parameters of a communication link between the electronic device and the cloud platform.

10. The system of claim 9, wherein the parameters indicate a transmission bandwidth capacity of the electronic device.

11. The system of claim 1, wherein the media display settings include any of sharpness, brightness, contrast, grain and white balance.

12. A media server, comprising:
processing circuitry configured to
evaluate display characteristics of a display of an electronic device and generate an evaluation result, the evaluation result indicating whether the display is capable of displaying media content with a dynamic range of a particular number of bits per color;
receive a source media file from a media storage; and
process the source media file, by converting the source media file according to the evaluation result, to obtain a display-dependent media file.

13. The media server of claim 12, wherein the media server is configured as a cloud service.

14. An electronic device, comprising:
a display;
a transmitter to transmit display characteristics of the display to a media server; and
a receiver to receive, from the media server, a display-dependent media file, the display dependent media file having been converted from a source media file based on whether the display characteristics indicate that the display is capable of displaying media content with a dynamic range of a particular number of bits per color, wherein
the display is configured to display the display-dependent media file.

15. The electronic device of claim 14, further comprising processing circuitry configured to decode the display-dependent media file.

16. A method, comprising:
evaluating display characteristics of a display of an electronic device and generating an evaluation result, the evaluation result indicating whether the display is capable of displaying media content with a dynamic range of a particular number of bits per color;
receiving a source media file from a media storage; and
processing the source media file, by converting the source media file according to the evaluation result, to obtain a display-dependent media file.

17. The method of claim 16, further comprising receiving the display characteristics from the electronic device.

18. The method of claim 16, further comprising transmitting the display-dependent media file to the electronic device.

19. The method of claim 16, further comprising:
processing of the source media file to obtain a pre-visualization media file; and
transmitting the pre-visualization media file to the electronic device.

20. The method of claim 16, wherein the processing the source media file comprises at least one of;
converting a frame rate of the source media file;
adapting the source media file according to a display technique;
adapting the dynamic range of the source media file;
applying temporal and/or spatial dithering;
adapting a display resolution;
adapting a sub-pixel pattern of the source media file;
modifying a three-dimensional (3D) stereo content of the source media file;
removing temporal artifacts from the source media file;
transforming an interlaced source media file to a non-interlaced source media file;
modifying an aspect ratio of the source media file; and
changing contrast characteristics according to ambient light conditions.

* * * * *